United States Patent
Kato et al.

(10) Patent No.: US 11,318,895 B2
(45) Date of Patent: May 3, 2022

(54) SOUNDPROOFING DEVICE FOR TRANSMISSION

(71) Applicant: TOYOTA JIDOSHA KABUSHIKI KAISHA, Aichi-ken (JP)

(72) Inventors: Shotaro Kato, Shizuoka-ken (JP); Akiko Nishimine, Susono (JP); Fusahiro Tsukano, Susono (JP); Yu Miyahara, Susono (JP); Yuya Takahashi, Susono (JP); Akinori Goto, Shizuoka-ken (JP); Hiroshi Takekawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 286 days.

(21) Appl. No.: 16/728,132

(22) Filed: Dec. 27, 2019

(65) Prior Publication Data

US 2020/0215997 A1 Jul. 9, 2020

(30) Foreign Application Priority Data

Jan. 8, 2019 (JP) .............................. JP2019-001389

(51) Int. Cl.
| | | |
|---|---|---|
| *B60R 13/08* | (2006.01) | |
| *F01N 1/02* | (2006.01) | |
| *F23M 20/00* | (2014.01) | |
| *B60K 6/405* | (2007.10) | |

(52) U.S. Cl.
CPC .......... *B60R 13/0838* (2013.01); *B60K 6/405* (2013.01); *F01N 1/023* (2013.01); *F23M 20/005* (2015.01)

(58) Field of Classification Search
CPC ............ B60R 13/0838; B60R 13/0884; B60R 2013/0807; B60K 6/40; B60K 6/405; F01N 1/023; F23M 20/005
See application file for complete search history.

(56) References Cited

U.S. PATENT DOCUMENTS

| | | | |
|---|---|---|---|
| 10,088,796 B2 * | 10/2018 | Ishida | .................. G10K 11/172 |
| 11,021,870 B1 * | 6/2021 | McKnight | ................. E04B 1/84 |
| 2016/0076443 A1 * | 3/2016 | Sei | .......................... F02B 77/13 |
| | | | 123/198 E |

(Continued)

FOREIGN PATENT DOCUMENTS

| | | | | |
|---|---|---|---|---|
| DE | 102018110370 A1 * | 5/2019 | ......... B60H 1/00342 |
| JP | 2001-41020 A | 2/2001 | |

(Continued)

*Primary Examiner* — Jeremy A Luks
(74) *Attorney, Agent, or Firm* — Hauptman Ham, LLP (57) ABSTRACT

A soundproofing device for a transmission according to the present disclosure is provided to transmit the power of one or more prime movers (for example, internal combustion engine and electric motor). The soundproofing device includes a Helmholtz resonator including: a wall that forms a Helmholtz resonance chamber; and an opening formed in the wall so as to cause the Helmholtz resonance chamber to communicate with the outside of the Helmholtz resonance chamber. The wall includes a transmission case that accommodates the transmission and a housing of a component mounted on the transmission (for example, PCU housing). The Helmholtz resonance chamber is formed between the transmission case and the housing.

6 Claims, 5 Drawing Sheets

(56) References Cited

U.S. PATENT DOCUMENTS

2017/0015199 A1     1/2017  Shiba
2018/0374467 A1*   12/2018  Tomiyama .......... B60R 13/0838

FOREIGN PATENT DOCUMENTS

| JP | 2017-24466 A | 2/2017 |
| JP | 202051584 A | 4/2020 |
| WO | 2012/144078 A1 | 10/2012 |

* cited by examiner

SOUNDPROOFING DEVICE FOR TRANSMISSION

CROSS-REFERENCE TO RELATED APPLICATION

The present disclosure claims priority under 35 U.S.C. § 119 to Japanese Patent Application No. 2019-001389, filed on Jan. 8, 2019. The content of which is incorporated herein by reference in its entirety.

BACKGROUND

Technical Field

The present disclosure relates to a soundproofing device for a transmission, and more particularly to a soundproofing device using Helmholtz resonance.

Background Art

For example, JP 2017-024466 A discloses a hybrid vehicle that includes an internal combustion engine and an electric motor for traveling as its prime movers. A housing for accommodating the electric motor houses not only this electric motor but also a power distribution device (gears). Therefore, this housing also functions as a transmission case for accommodating a transmission having gears for transmitting the power of the prime movers. Moreover, a power control unit (PCU) for driving the electric motor is mounted on the housing.

Moreover, WO 2012/144078 A1 discloses a soundproofing device including a Helmholtz resonator. This Helmholtz resonator has an opening for causing a part of a cavity (Helmholtz resonance chamber) to communicate with the outside. In this resonance chamber, a sound emission part (sound source) which is a soundproofing object is arranged. According to the Helmholtz resonator configured as described above, the following effect can be obtained by causing the sound source to exist inside the Helmholtz resonator. That is to say, when a sound having a frequency higher than a Helmholtz resonance frequency is generated, the sound in the resonance chamber becomes difficult to propagate to the outside due to the inertial effect of the air in the opening of the Helmholtz resonator. As a result, a soundproofing effect can be achieved in a wide frequency band located on the high frequency side of the Helmholtz resonance frequency.

SUMMARY

In a transmission equipped with gears for transmitting the power of a prime mover, vibration forced by the gears is transmitted to a transmission case, and this vibration is radiated from the surface of the transmission case into air as sound.

If noise radiated from this kind of transmission case can be reduced by using existing components, it is possible to take measures against noise while reducing an increase in cost.

The present disclosure has been made in view of the problem described above, and an object of the present disclosure is to provide a soundproofing device for a transmission that can reduce a radiated sound from a transmission case by using Helmholtz resonance while reducing an increase in cost.

A soundproofing device for a transmission to transmit the power of one or more prime movers according to the present disclosure includes a Helmholtz resonator including: a wall that forms a Helmholtz resonance chamber; and an opening formed in the wall so as to cause the Helmholtz resonance chamber to communicate with an outside of the Helmholtz resonance chamber. The wall includes a transmission case that accommodates the transmission and a housing of a component mounted on the transmission. The Helmholtz resonance chamber is formed between the transmission case and the housing.

The one or more prime movers may include an electric motor. The component may be a power control unit configured to control the electric motor.

The component may be an oil cooler configured to cool oil that lubricates the transmission.

The transmission may include a plurality of gear positions. The component may be a shift actuator configured to switch the gear position.

The housing may include an enclosure that protrudes, in a hollow prismatic or cylindrical shape, toward the transmission case. The Helmholtz resonance chamber may be defined by the enclosure. The opening may be formed between the enclosure and the transmission case opposed to the enclosure.

The length of the Helmholtz resonance chamber in a first direction in which the transmission case and the housing are opposed to each other may be shorter than the length of the Helmholtz resonance chamber in a second direction perpendicular to the first direction.

The Helmholtz resonator included in the soundproofing device of the transmission according to the present disclosure is configured by using a housing of a component mounted on the transmission together with the transmission case. In this manner, according to the soundproofing device of the present disclosure, the Helmholtz resonator is configured by using an existing component. Therefore, it is possible to reduce a radiation noise from the transmission case by using the Helmholtz resonance while reducing an increase in cost.

DETAILED DESCRIPTION

In the following, embodiments of the present disclosure will be described with reference to the accompanying drawings. However, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or the like that are described in conjunction with the following embodiments are not necessarily essential to the present disclosure unless explicitly shown otherwise, or unless the present disclosure is explicitly specified by the structures or the like theoretically.

Soundproofing Principle of Helmholtz Resonator Used as Premise

Figure 1:
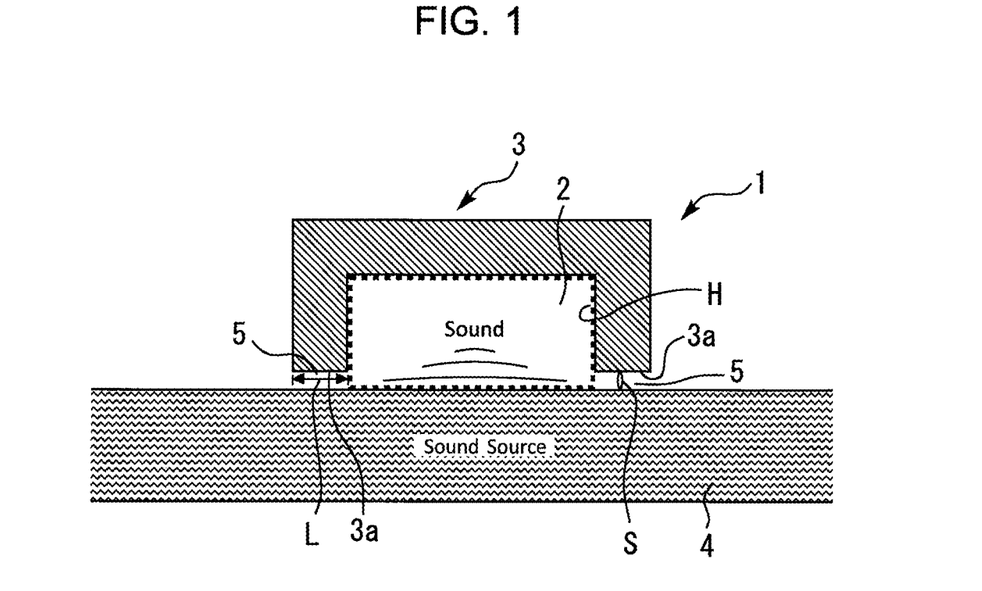
FIG. 1 is a cross-sectional view that schematically illustrates an example of a shape of a Helmholtz resonator using a soundproofing principle used as a premise in a soundproofing device for a transmission according to the present disclosure.

FIG. 1 is a cross-sectional view that schematically illustrates an example of a shape of a Helmholtz resonator using a soundproofing principle used as a premise in a soundproofing device for a transmission according to the present disclosure. It should be noted that a chamber specified by a broken line frame in FIG. 1 corresponds to a Helmholtz resonance chamber H of the Helmholtz resonator using this soundproofing principle. This also applies to each example of configurations in FIG. 3 and subsequent figures.

A Helmholtz resonator 1 shown in FIG. 1 has a Helmholtz resonance chamber (hereinafter, referred to simply as "resonance chamber") 2 corresponding to an example of the Helmholtz resonance chamber H. The Helmholtz resonator 1 uses a soundproof cover 3 and a sound source member 4 as a wall forming the resonance chamber 2. That is to say, in the Helmholtz resonator 1, a part of the wall forming the resonance chamber 2 is configured by the sound source member 4. In addition, the Helmholtz resonator 1 has an opening 5 for causing a part of the resonance chamber 2 to communicate with the outside. To be more specific, it is assumed that the soundproof cover 3 has a three-dimensional shape (for example, rectangular parallelepiped shape or cylindrical shape) with an open bottom portion opposed to the sound source member 4. Also, in this example, the opening 5 is formed by using a gap between an end portion 3a of the soundproof cover 3 and the sound source member 4.

A resonance frequency (Helmholtz resonance frequency) $f_0$ of the Helmholtz resonator 1 is determined by the following Equation (1).

c: Speed of sound (m/s)
V: Volume of the Helmholtz resonator (resonance chamber) $(m^3)$
L: Length of the opening (m)

S: Area of the opening (i.e., area of the opening when viewed from the direction of the length L) $(m^2)$
δ: Open end correction coefficient (which is a correction value determined according to the shape of the Helmholtz resonator and also experimentally determined)

$$f_0 = \frac{c}{2\pi}\sqrt{\frac{S}{V(L+\delta)}} \quad (1)$$

By appropriately determining the dimensions of each part of the Helmholtz resonator 1 (i.e., the volume V, the area S and the length L in the Equation (1)), a Helmholtz resonance chamber H having a desired Helmholtz resonance frequency $f_0$ can be obtained.

Figure 2:
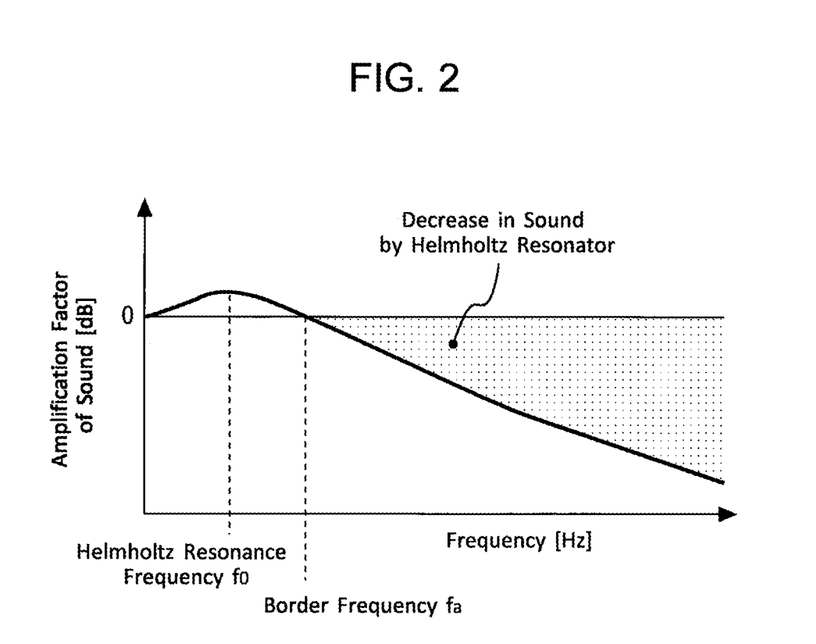
FIG. 2 is a graph used to explain a soundproofing effect by the Helmholtz resonator shown in FIG. 1.

FIG. 2 is a graph used to explain a soundproofing effect by the Helmholtz resonator 1 shown in FIG. 1. FIG. 2 shows a relationship between the input frequency of the Helmholtz resonator 1 (i.e., the frequency (Hz) of a radiated sound from the sound source member 4) and the amplification factor (dB) of the radiated sound. In the Helmholtz resonator 1, resonance of the radiated sound inputted to the resonance chamber 2 occurs at the resonance frequency $f_0$. Because of this, as shown in FIG. 2, the radiated sound is amplified in a frequency band around the resonance frequency $f_0$ at which the amplification factor has a peak. On the other hand, in a high frequency band higher than this frequency band (i.e., a high frequency band higher than a border frequency $f_a$ shown in FIG. 2), the amplification factor is lower than 0 dB, and the higher the frequency of a radiated sound inputted is, the lower the amplification factor is. This is because, in the high frequency band described above, the radiated sound inside the Helmholtz resonator 1 (i.e., inside the resonance chamber 2) becomes difficult to propagate to the outside of the Helmholtz resonator 1 due to the inertial effect of the air in the opening 5.

Therefore, according to the Helmholtz resonator 1 based on the soundproofing principle described above, the soundproofing effect can be obtained in a wider frequency band than that of a general Helmholtz resonator (for example, as disclosed in JP 2001-041020 A, a Helmholtz resonator having a configuration in which a sound source member is not used as a wall forming a Helmholtz resonance chamber) in which the soundproofing effect can be obtained only in a narrow frequency band around a resonance frequency. It should be noted that the details of the soundproofing principle that the present disclosure is premised on are disclosed in WO 2012/144078 A1.

Supplementary Explanation on Helmholtz Resonance Chamber H

As described above, the "Helmholtz resonance chamber H" of a Helmholtz resonator according to the present soundproofing principle is a chamber which is formed by a wall having a portion corresponding to a sound source member, and which can communicate with the outside through an opening formed in the wall. Also, according to the Helmholtz resonator having this kind of Helmholtz resonance chamber H, as described with reference to FIG. 2, a soundproofing effect (sound pressure reduction effect) can be obtained in a frequency band located on the higher frequency side than the Helmholtz resonance frequency $f_0$ determined by Equation (1). Therefore, it can be said that the Helmholtz resonance chamber H using the soundproofing principle has a soundproofing effect in a frequency band higher than the Helmholtz resonance frequency $f_0$ (more specifically, in a high frequency band higher than the border frequency $f_a$).

Supplementary Explanation on Sound Source Member

The "sound source member" described above is a member that radiates sound and, more specifically, a member that radiates, into the air as sound, vibration transmitted from a sound generating source (i.e., a compulsory sound source). In each of the following embodiments, soundproofing devices according to the soundproofing principle described so far are applied to, for example, a transmission (power transmission device) mounted on a vehicle. The transmission includes gears for transmitting the power of one or more prime movers (for example, at least one of an internal combustion engine and an electric motor). As a result, in the example of the transmission, vibration forced by the gears which is a compulsory source is transmitted to a transmission case, and the vibration is radiated from the surface of the transmission case into air as sound. Therefore, in the example of the transmission, the transmission case for accommodating the transmission corresponds to the sound source member described above.

If noise radiated from the transmission case as described above can be reduced by using existing components, it can be said that measures against noise can be performed while reducing an increase in cost. In view of this kind of issue, soundproofing devices according to the following respective embodiments are provided.

1. First Embodiment

A first embodiment according to the present disclosure will be described with reference to FIGS. 3 to 7.

1-1. Configuration Around Transmission

Figure 3:
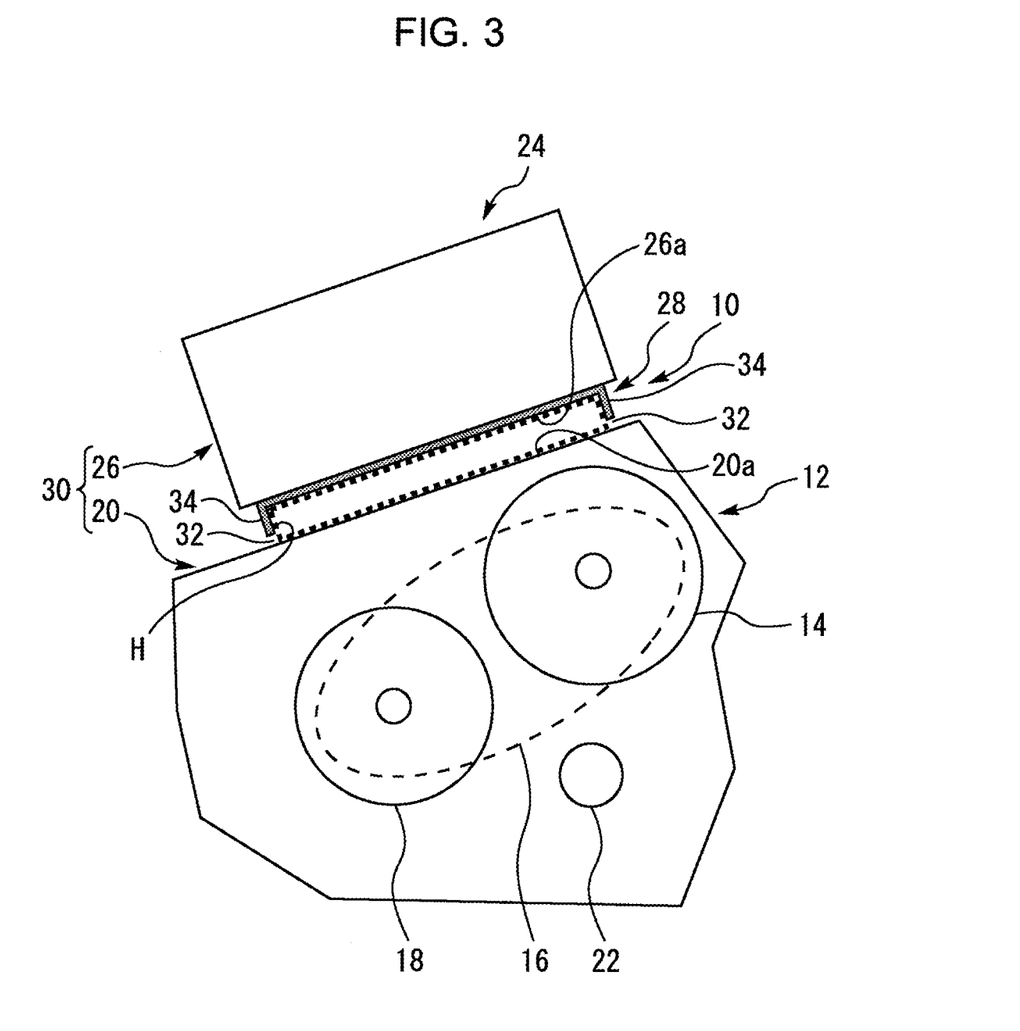
FIG. 3 is a diagram that schematically illustrates a configuration around a transmission to which a soundproofing device according to a first embodiment of the present disclosure is applied.

FIG. 3 is a diagram that schematically illustrates a configuration around a transmission 12 to which a soundproofing device 10 according to the first embodiment of the present disclosure is applied. The transmission 12 shown in FIG. 3 is mounted on a vehicle as an example. An example of a vehicle assumed in the first embodiment is a hybrid vehicle provided with an internal combustion engine (not shown) and an electric motor (motor generator) 14 for traveling as its prime movers.

The transmission 12 includes gears for transmitting the power from the prime movers (the internal combustion engine and the electric motor 14). In more detail, in the example shown in FIG. 3, the gears of the transmission 12 include a power split device 16 (more specifically, planetary gear unit). One of the functions of this power split device 16 is to split the torque of the internal combustion engine into a path for driving the vehicle and a path for driving a generator (motor generator) 18.

In addition, in the example shown in FIG. 3, a transmission case 20 for accommodating the transmission 12 houses the electric motor 14 and the generator 18 together with the transmission 12. Moreover, the transmission case 20 houses not only the transmission 12 (gears, such as the power split device 16) but also a differential gear 22. Therefore, in other words, the transmission case 20 also corresponds to a case of a transaxle. It should be noted that the transmission case 20 is formed, for example, by die casting of aluminum.

As shown in FIG. 3, a power control unit (Power Control Unit) 24 is mounted on an upper surface 20a of the transmission case 20. The PCU24 is a power converter for controlling the electric motor 14 and the generator 18, and typically includes inverters for converting DC power of a battery (not shown) into AC power suitable for controlling the electric motor 14 and the generator 18.

1-2. Configuration of Helmholtz Resonator

1-2-1. Outline

The PCU24 is fixed to the transmission case 20 via a support member (not shown). As shown in FIG. 3, there is a gap between the upper surface 20a of the transmission case 20 and a bottom surface 26a of a PCU housing 26 of the PCU 24 opposed to the upper surface 20a. The soundproofing device 10 according to the present embodiment includes a Helmholtz resonator 28 that uses the gap to form a Helmholtz resonance chamber H according to the soundproofing principle described with reference to FIGS. 1 and 2.

Figure 4:
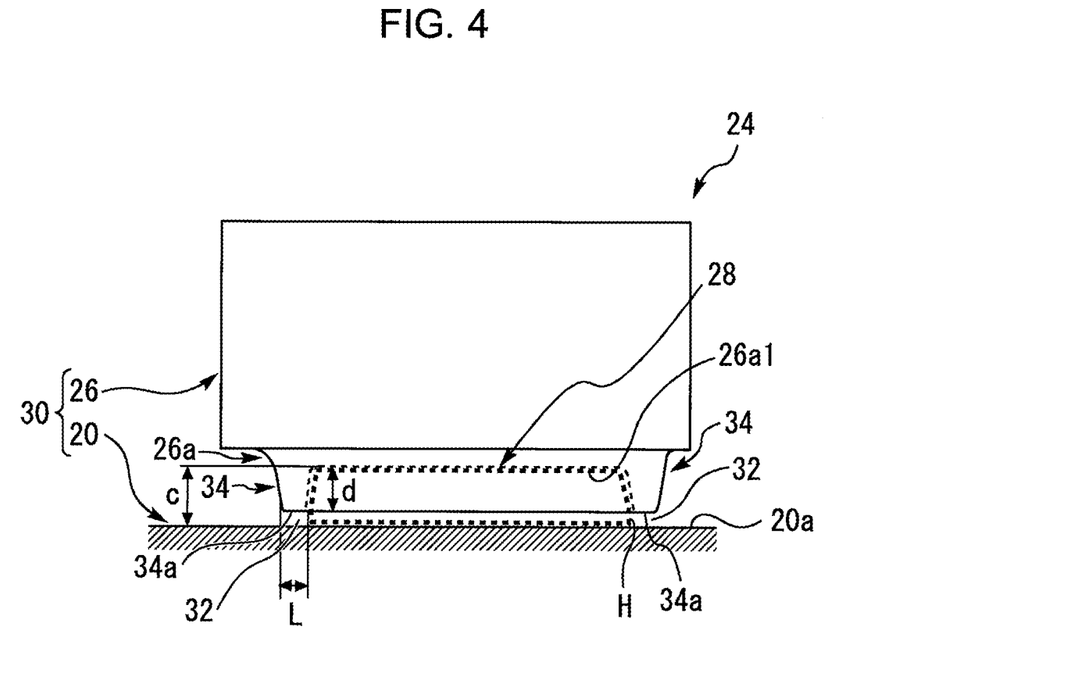
FIG. 4 is an enlarged view that schematically illustrates a configuration around a Helmholtz resonator shown in FIG. 3.
Figure 5:
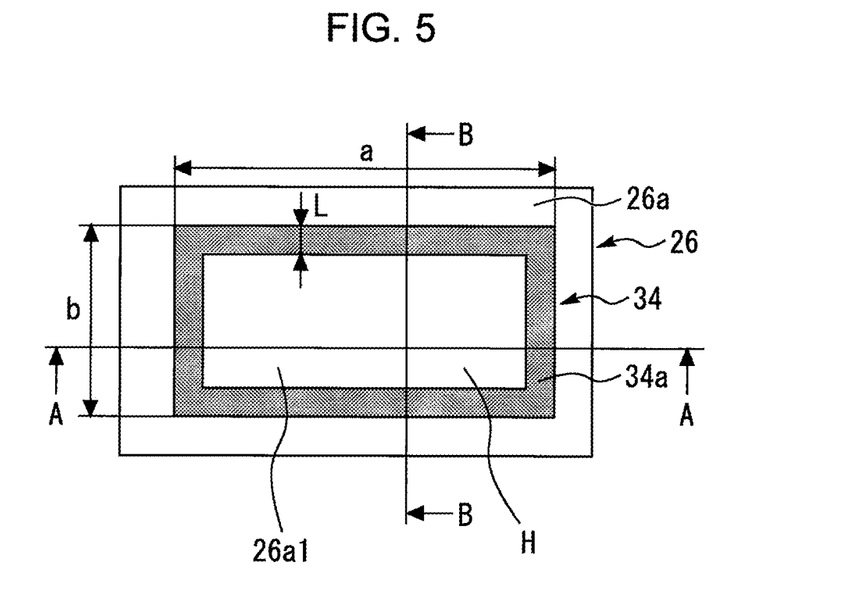
FIG. 5 is a view of a bottom surface of a PCU housing seen from the side of an upper surface of a transmission case in FIG. 4.

FIG. 4 is an enlarged view that schematically illustrates a configuration around the Helmholtz resonator 28 shown in FIG. 3. FIG. 5 is a view of the bottom surface 26a of the PCU housing 26 seen from the side of the upper surface 20a of the transmission case 20 in FIG. 4. It should be noted that, although the shape of the upper surface 20a is actually complicated in many cases, in FIG. 4, the upper surface 20a of the transmission case 20 is represented by a plane for convenience of description.

As shown in FIG. 4, the Helmholtz resonator 28 has a wall 30 and an opening 32. The Helmholtz resonance chamber H is formed between the transmission case 20 and the PCU housing 26 by this wall 30.

The soundproofing device 10 according to the present embodiment is characterized in that the wall 30 is configured as follows. That is to say, the wall 30 is configured by the transmission case 20, and the PCU housing 26 of the PCU 24, which is an example of components mounted on the transmission case 20.

The opening 32 is formed in the wall 30 so as to cause the Helmholtz resonance chamber H to communicate with the outside. As an example, the opening 32 is formed between the transmission case 20 and the PCU housing 26.

1-2-2. Enclosure of PCU Housing

Figure 6:
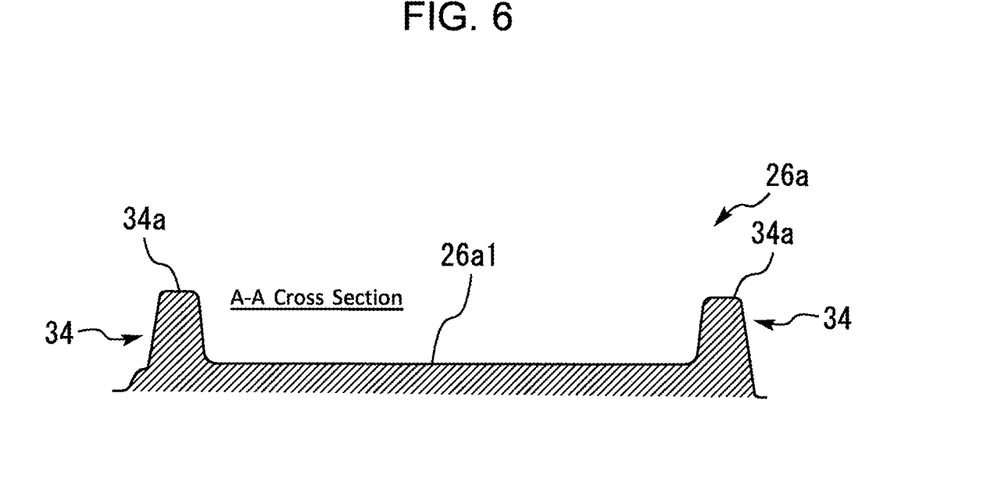
FIG. 6 is a cross-sectional view obtained by cutting a bottom portion of the PCU housing along a line A-A shown in FIG. 5.
Figure 7:
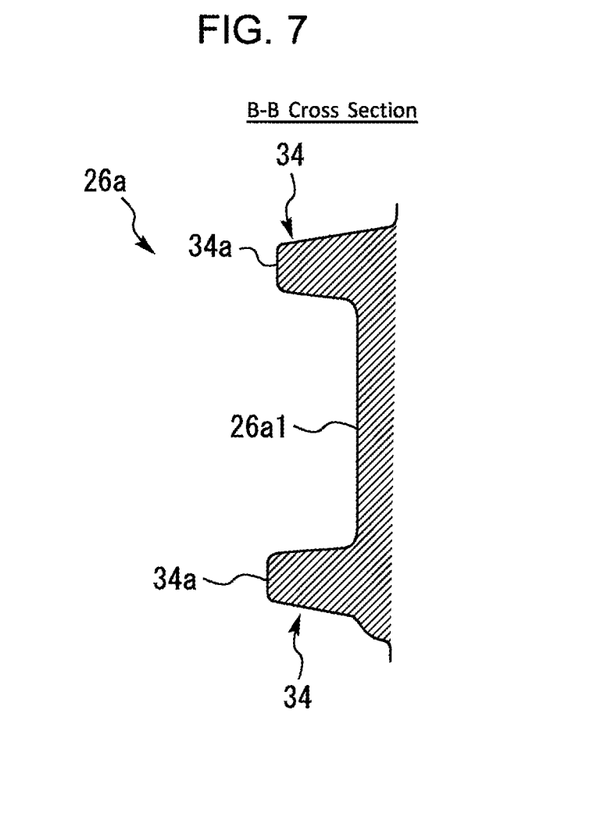
FIG. 7 is a cross-sectional view obtained by cutting the bottom portion of the PCU housing along a line B-B shown in FIG. 5.

Next, a specific shape example of the bottom surface 26a of the PCU housing 26 for forming the Helmholtz resonance chamber H will be described with additional reference to FIGS. 6 and 7 in conjunction with FIGS. 4 and 5. FIG. 6 is a cross-sectional view obtained by cutting the bottom portion of the PCU housing 26 along a line A-A shown in FIG. 5. FIG. 7 is a cross-sectional view obtained by cutting the bottom portion of the PCU housing 26 along a line B-B shown in FIG. 5.

As can be seen from these figures, the bottom surface 26a of the PCU housing 26 is provided with an enclosure 34 corresponding to a part of the wall 30 forming the Helmholtz resonance chamber H. The enclosure 34 is formed so as to protrude, in a hollow prismatic shape, from the bottom surface 26a toward the upper surface 20a. A portion of the gap between the upper surface 20a of the transmission case 20 and the bottom surface 26a of the PCU housing 26, which functions as the Helmholtz resonance chamber H, is defined by this enclosure 34. Also, the opening 32, more specifically, is formed between a tip end surface 34a of the enclosure 34 and the upper surface 20a of the transmission case 20 opposed to the tip end surface 34a.

The bottom surface 26a of the PCU housing 26 can be formed, for example, by press-working a metal plate. It should be noted that the component configuring the bottom surface 26a of the PCU housing 26 corresponds to the soundproof cover shown in FIG. 1. In addition, the shape of the enclosure 34 when viewed from the side of the upper surface 20a of the transmission case 20 is not limited to the rectangular shape shown in the example of FIG. 5, and may be any other shape (for example, square, circular, or elliptical shape).

1-2-3. Examples of Setting Helmholtz Resonance Frequency $f_0$

Next, examples of setting the Helmholtz resonance frequency $f_0$ will be described with reference to FIGS. 4 and 5. In the example of the Helmholtz resonator 28, the volume of the Helmholtz resonance chamber H formed by the wall 30 (the transmission case 20 and the PCU housing 26) corresponds to the volume V in Equation (1) described above, which is an approximate equation of the Helmholtz resonance frequency $f_0$. In addition, the width of the tip end surface 34a of the enclosure 34 of the PCU housing 26 corresponds to the length L of the opening in Equation (1). Furthermore, the sum of the area of the opening 32 when viewed from the direction of the length L with respect to each of four faces of the enclosure 34 corresponds to the area S of the opening in Equation (1). It should be noted that, in the example of the opening 32, although the height of the opening 32 (i.e., the distance between the upper surface 20a and the tip end surface 34a) is constant regardless of the position, the height of the "opening" according to the present disclosure may be different depending on the position.

In the example of using the enclosure 34 for defining the Helmholtz resonance chamber H and forming the opening 32, the Helmholtz resonance frequency $f_0$ can be adjusted by changing the shape of the enclosure 34 to adjust at least one of the length L of the opening 32 and the height d of the enclosure 34. More specifically, the height d mentioned here corresponds to the height (protrusion amount) of the enclosure 34 with respect to a base surface 26a1 of the bottom surface 26a.

As already described with reference to FIG. 2, in the Helmholtz resonator according to the soundproofing principle used as a premise in the present embodiment, the soundproofing effect (sound pressure reduction effect) can be achieved in a frequency band on the higher frequency side than the Helmholtz resonance frequency $f_0$ specified by Equation (1) (more specifically, in the high frequency band higher than the border frequency $f_a$). Therefore, it is desirable that the Helmholtz resonance frequency $f_0$ be as low as possible in order to achieve the soundproofing effect in a wide frequency band. Here, there is a knowledge that the radiated sound from a transmission case (gear noise of the transmission) generally increases in a frequency band of 1000 to 1500 kHz or more.

The value of the Helmholtz resonance frequency $f_0$ set in a Helmholtz resonator included in a soundproofing device according to the present disclosure is not particularly limited in broad terms. However, in view of the knowledge described above, the Helmholtz resonance frequency $f_0$ may be set to, for example, 1500 kHz or less. In addition, it is more desirable that the Helmholtz resonance frequency $f_0$ be set to, for example, 1000 kHz or less.

1-2-4. Numerical Examples of Shape of Each Part of Helmholtz Resonator

Next, concrete numerical examples of the Helmholtz resonator 28 will be described with reference to FIGS. 4 and 5. With regard to the wall 30 (the enclosure 34), the width (outer width) in the horizontal direction of the sheet in FIG. 5 is set to a reference sign "a", and the width (outer width) in the vertical direction of the sheet is set to a reference sign "b". Also, a reference sign "c" is a distance (gap) between the upper surface 20a and the base surface (the surface on the tip end side of the enclosure 34) 26a1 of the bottom surface 26a. These width a and b and distance c are roughly determined by the size of the PCU 24 and the mounting requirements of the PCU 24 with respect to the transmission case 20. Although, the numerical values of the width a and b and the distance c are not particularly limited, the width a may be about 250 to 300 mm, the width b may be about 150 mm, and the distance c may be about 50 mm, as an example. In the example of the Helmholtz resonator 28 having this kind of dimensions, the Helmholtz resonance frequency $f_0$ can be set to about 1000 KHz by setting both the height d and the length L of the opening 32 to about 30 mm.

It should be noted that the distance (gap) c described above is supplementarily described as followed. In FIG. 4, the upper surface 20a of the transmission case 20 is represented by the plane as described above. The distance c between the upper surface 20a and the base surface 26a1 in FIG. 4, which is represented in a simplified manner in a plane, corresponds to a distance between the basic surface 26a and the upper surface 20a (plane) whose position is adjusted to obtain a Helmholtz resonance chamber H having the same volume as the Helmholtz resonance chamber H formed between the actual upper surface 20a and the actual bottom surface 26a that have a complex shape.

1-2-5. Supplemental Explanation on Helmholtz Resonance Chamber H

Additionally, in the example of the Helmholtz resonator 28, as shown in FIGS. 4 and 5, the length of the Helmholtz resonance chamber H in a first direction in which the transmission case 20 and the PCU housing 26 are opposed to each other (in FIG. 4, the vertical direction of the drawing) is shorter than the length of the Helmholtz resonance chamber H in a second direction perpendicular to the first direction (in the example of the Helmholtz resonator 28, the direction of the width a and the direction of the width b).

1-3. Advantageous Effect

As described so far, the Helmholtz resonator 28 included in the soundproofing device 10 according to the present embodiment uses the transmission case 20 (sound source member) as a part of the wall 30 forming the Helmholtz resonance chamber H. Because of this, the Helmholtz resonator 28 corresponds to a Helmholtz resonator according to the soundproofing principle described with reference to FIGS. 1 and 2. On that basis, the Helmholtz resonator 28 is formed, together with the transmission case 20, by using the bottom surface 26a of the PCU housing 26 of the PCU 24, which is an example of the component mounted on the transmission 12. As just described, according to the soundproofing device 10, the Helmholtz resonator 28 according to the soundproofing principle described above can be configured by using the existing component in the vehicle. Therefore, since it is unnecessary to add a dedicated soundproof cover in order to configure the Helmholtz resonator 28, it is possible to reduce the radiated sound from the transmission case 20 by using the Helmholtz resonance while reducing an increase in cost caused by the addition of the components and the assembling process therefor.

It should be noted that, in the first embodiment described above, the enclosure 34 is formed integrally with the PCU housing 26. However, the "enclosure" according to the present disclosure may not always be formed integrally with the "housing of a component mounted on the transmission", such as the PCU housing 26. That is to say, at least a part of the enclosure may be separate from the housing of the mounted component. Even in this kind of example, the Helmholtz resonator can be configured using the housing (i.e., the existing component). Because of this, it is possible to reduce the radiated sound while reducing an increase in cost due to the addition of components being kept to the minimum necessary. This also applies to enclosures 52 and 78 according to second and third embodiments which will be described below.

2. Second Embodiment

Next, a second embodiment according to the present disclosure will be described with reference to FIG. 8. It should be noted that redundant descriptions with respect to those of the first embodiment are omitted as appropriate.

Figure 8:
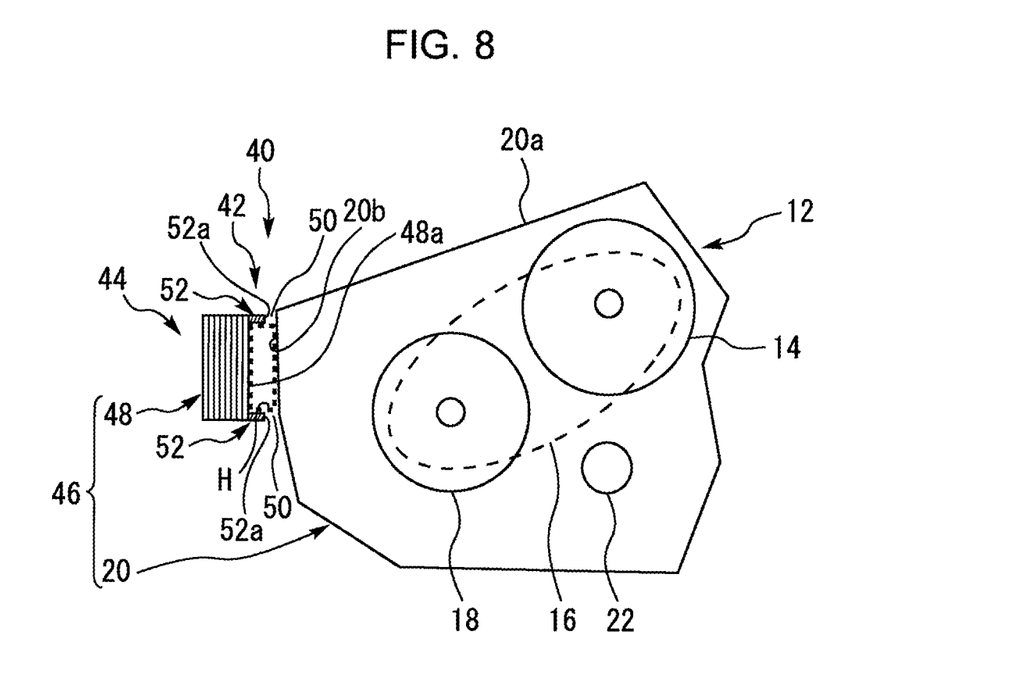
FIG. 8 is a diagram that schematically illustrates a configuration around the transmission to which a soundproofing device according to a second embodiment of the present disclosure is applied.

FIG. 8 is a diagram that schematically illustrates a configuration around the transmission 12 to which a soundproofing device 40 according to the second embodiment of the present disclosure is applied. The soundproofing device 40 according to the second embodiment is different from the soundproofing device 10 according to the first embodiment in terms of the component used to form the Helmholtz resonance chamber H together with the transmission case 20.

Specifically, according to this embodiment, an oil cooler 44 is mounted on a side surface 20b of the transmission case 20. The oil cooler 44 cools oil that lubricates the transmission 12. The soundproofing device 40 according to the present embodiment includes a Helmholtz resonator 42. As shown in FIG. 8, the Helmholtz resonance chamber H of the Helmholtz resonator 42 is formed by using a gap between the oil cooler 44, which is another example of a component mounted on the transmission case 20, and the transmission case 20.

To be more specific, a wall 46 of the Helmholtz resonator 42 is configured by the transmission case 20 and an oil cooler housing 48 opposed to the transmission case 20. Also, an opening 50 of the Helmholtz resonator 42 is formed between the transmission case 20 and the oil cooler housing 48.

In addition, similarly to the bottom surface 26a of the PCU housing 26, a bottom surface 48a of the oil cooler housing 48 is provided with an enclosure 52 corresponding to a part of the wall 46 that forms the Helmholtz resonance chamber H. The enclosure 52 is formed so as to protrude, in a hollow prismatic or cylindrical shape, from the bottom surface 48a toward the side surface 20b. A portion of a gap between the side surface 20b of the transmission case 20 and the bottom surface 48a of the oil cooler housing 48, which functions as the Helmholtz resonance chamber H, is defined by this enclosure 52. Also, the opening 50, more specifically, is formed between a tip end surface 52a of the enclosure 52 and the side surface 20b of the transmission case 20 opposed to the tip end surface 52a.

According to the soundproofing device 40 so far, the same advantageous effect as the soundproofing device 10 according to the first embodiment can be achieved. That is to say, since it is unnecessary to add a dedicated soundproof cover in order to configure the Helmholtz resonator 42, it is possible to reduce the radiated sound from the transmission case 20 by using the Helmholtz resonance while reducing an increase in cost.

3. Third Embodiment

Next, a third embodiment according to the present disclosure will be described with referenced to FIG. 9. It should be noted that redundant descriptions with respect to those of the first embodiment are omitted as appropriate.

Figure 9:
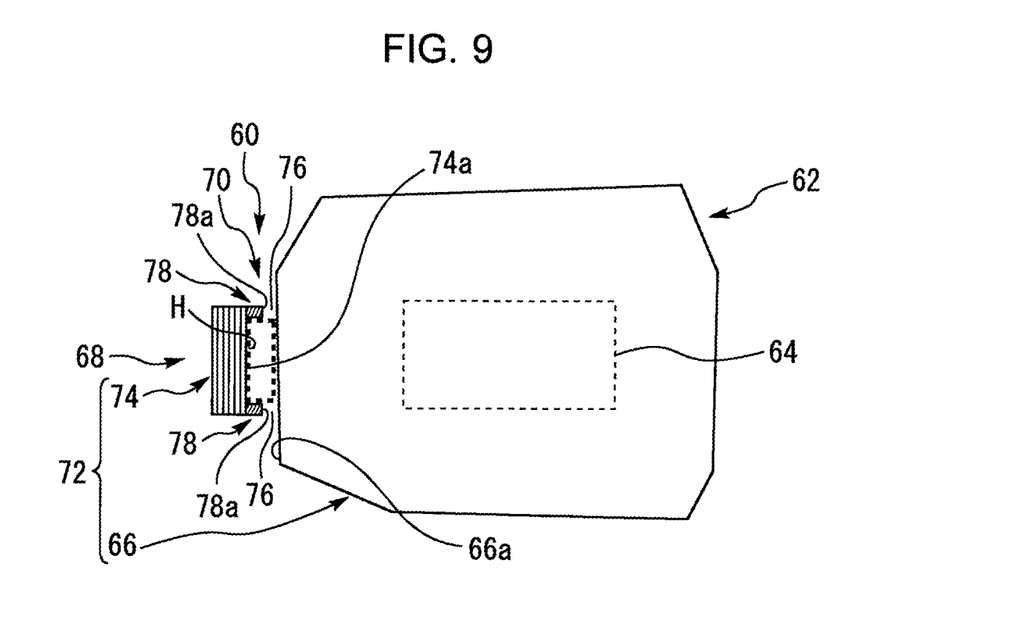
FIG. 9 is a diagram that schematically illustrates a configuration around a transmission to which a soundproofing device according to a third embodiment of the present disclosure is applied.

FIG. 9 is a diagram that schematically illustrates a configuration around a transmission 62 to which a soundproofing device 60 according to the third embodiment of the present disclosure is applied. The soundproofing device 60 according to the third embodiment is different from the soundproofing device 10 according to the first embodiment in terms of the configuration of the transmission and also the component used to form the Helmholtz resonance chamber together with the transmission case.

Specifically, as an example, the transmission 62 according to the third embodiment is an automatic transmission that is combined with an internal combustion engine (not shown) which is a prime mover and that has a plurality of gear positions. The transmission 62 includes gears 64 for transmitting the power of the prime mover. Moreover, a shift actuator 68 for switching the gear positions is mounted on a side surface 66a of a transmission case 66 for accommodating the transmission 62.

The soundproofing device 60 according to the present embodiment includes a Helmholtz resonator 70. As shown in FIG. 9, the Helmholtz resonance chamber H of the Helmholtz resonator 70 is formed by using a gap between the shift actuator 68, which is an example of a component mounted on the transmission case 66, and the transmission case 66 (sound source member).

To be more specific, a wall 72 of the Helmholtz resonator 70 is configured by the transmission case 66 and a shift actuator housing 74 opposed to the transmission case 66. Also, an opening 76 of the Helmholtz resonator 70 is formed between the transmission case 66 and the shift actuator housing 74.

In addition, similarly to the bottom surface 26a of the PCU housing 26, a bottom surface 74a of the shift actuator housing 74 is provided with an enclosure 78 corresponding to a part of the wall 72 that forms the Helmholtz resonance chamber H. The enclosure 78 is formed so as to protrude, in a hollow prismatic or cylindrical shape, from the bottom surface 74a toward the side surface 66a. A portion of a gap between the side surface 66a of the transmission case 66 and the bottom surface 74a of the shift actuator housing 74, which functions as the Helmholtz resonance chamber H, is defined by this enclosure 78. Also, the opening 76, more specifically, is formed between a tip end surface 78a of the enclosure 78 and the side surface 66a of the transmission case 66 opposed to the tip end surface 78a.

According to the soundproofing device 60 so far, the same advantageous effect as the soundproofing device 10 according to the first embodiment can be achieved. That is to say, since it is unnecessary to add a dedicated soundproof cover in order to configure the Helmholtz resonator 70, it is possible to reduce the radiated sound from the transmission case 66 by using the Helmholtz resonance while reducing an increase in cost.

4. Other Embodiments

4-1. Other Examples of Transmission

In the first and second embodiments, the gears of the transmission 12 are accommodated in the transmission case 20 together with the prime mover (electric motor 14) and the differential gear 22. However, in the "transmission" according to the present disclosure, gears may not be accommodated in the same case as at least one of one or more prime movers and a differential gear. Furthermore, the "transmission" according to the present disclosure may be, for example, one that transmits only the motive power of an electric motor, instead of the example of transmitting the motive power of both of the internal combustion engine and the electric motor 14 as in the transmission 12 according to the first and second embodiments, and the example of transmitting only the motive power of the internal combustion engine as in the transmission 62 according to the third embodiment.

4-2. Other Examples of Opening

In the first embodiment, the opening 32 of the Helmholtz resonator 28 is formed between the tip end surface 34a of the enclosure 34 that protrudes, in a hollow prismatic shape, from the bottom 26a toward the upper surface 20a, and the upper surface 20a of the transmission case 20 opposed to the tip end surface 34a. This similarly applies to the second and third embodiments. However, the opening in the Helmholtz resonator according to the present disclosure may be formed as follows, for example, instead of the example of using a gap between an enclosure and a transmission case as described above. That is to say, the opening may include an enclosure that extends so as to come into contact with a transmission case (i.e., without forming a gap between the enclosure and the transmission case) and may use one or a plurality of through holes formed in a wall surface of the enclosure.

Furthermore, in another example of the opening, a flange portion as described below may be formed with respect to a tip end portion of the enclosure 34 (see FIG. 4), and an opening may be formed between the flange portion and the upper surface 20a (see FIG. 4) of the transmission case 20. The flange portion referred to herein is formed so as to extend in parallel with the upper surface 20a from the tip end portion of the enclosure 34 toward the outside of the Helmholtz resonance chamber H.

The embodiments and modification examples described above may be combined in other ways than those explicitly described above as required and may be modified in various ways without departing from the scope of the present disclosure.

What is claimed is:

1. A soundproofing device for a transmission to transmit a power of one or more prime movers, comprising a Helmholtz resonator including:
    a wall that forms a Helmholtz resonance chamber; and
    an opening formed in the wall so as to cause the Helmholtz resonance chamber to communicate with an outside of the Helmholtz resonance chamber,
    wherein the wall includes a transmission case that accommodates the transmission and a housing of a component mounted on the transmission, and
    wherein the Helmholtz resonance chamber is formed between the transmission case and the housing.

2. The soundproofing device according to claim 1, wherein the one or more prime movers includes an electric motor, and
    wherein the component is a power control unit configured to control the electric motor.

3. The soundproofing device according to claim 1, wherein the component is an oil cooler configured to cool oil that lubricates the transmission.

4. The soundproofing device according to claim 1, wherein the transmission includes a plurality of gear positions, and
    wherein the component is a shift actuator configured to switch the gear position.

5. The soundproofing device according to claim 1, wherein the housing includes an enclosure that protrudes, in a hollow prismatic or cylindrical shape, toward the transmission case,
    wherein the Helmholtz resonance chamber is defined by the enclosure, and
    wherein the opening is formed between the enclosure and the transmission case opposed to the enclosure.

6. The soundproofing device according to claim 1, wherein a length of the Helmholtz resonance chamber in a first direction in which the transmission case and the housing are opposed to each other is shorter than a length of the Helmholtz resonance chamber in a second direction perpendicular to the first direction.

* * * * *